United States Patent [19]

Olper et al.

[11] Patent Number: 5,013,356

[45] Date of Patent: May 7, 1991

[54] PROCESS FOR THE PROCESSING OF SLAG FROM ALUMINIUM SCRAP AND WASTE MELTING, RECOVERY OF COMPONENTS THEREOF AND TREATMENT OF GASSES GENERATED

[75] Inventors: Marco Olper, Monza; Tullio Corsini, Sesto Calende; Pierluigi Fracchia, Milan, all of Italy

[73] Assignee: Engitec Impianti S.p.A., Milan, Italy

[21] Appl. No.: 465,777

[22] Filed: Jan. 16, 1990

[30] Foreign Application Priority Data

Jan. 18, 1989 [IT] Italy ............................. 19118 A/89

[51] Int. Cl.⁵ .............................................. C22B 7/04
[52] U.S. Cl. ....................................... 75/586; 75/672; 423/497
[58] Field of Search ............... 75/24, 97 R, 672, 586; 423/131, 49

[56] References Cited

U.S. PATENT DOCUMENTS

| | | | |
|---|---|---|---|
| 4,050,999 | 9/1977 | Johnson | 75/672 |
| 4,252,776 | 2/1981 | Huckabay et al. | 75/24 |
| 4,368,070 | 1/1983 | Fracchia | 75/24 |
| 4,732,606 | 3/1988 | Kobele et al. | 75/24 |

*Primary Examiner*—Melvyn J. Andrews
*Attorney, Agent, or Firm*—Shlesinger Fitzsimmons Shlesinger

[57] ABSTRACT

The present invention relates to a process and a plant for the processing of saline slag from the melting of aluminium scrap and waste with a saline flux in which the salts constituting the flux are recovered and other components of the slag are separated. The harmful or toxic gases developed during this processing are subjected to combustion to produce flue gases dispersible in the atmosphere with recovery of combustion heat, preferably used over in processing the slag.

5 Claims, 1 Drawing Sheet

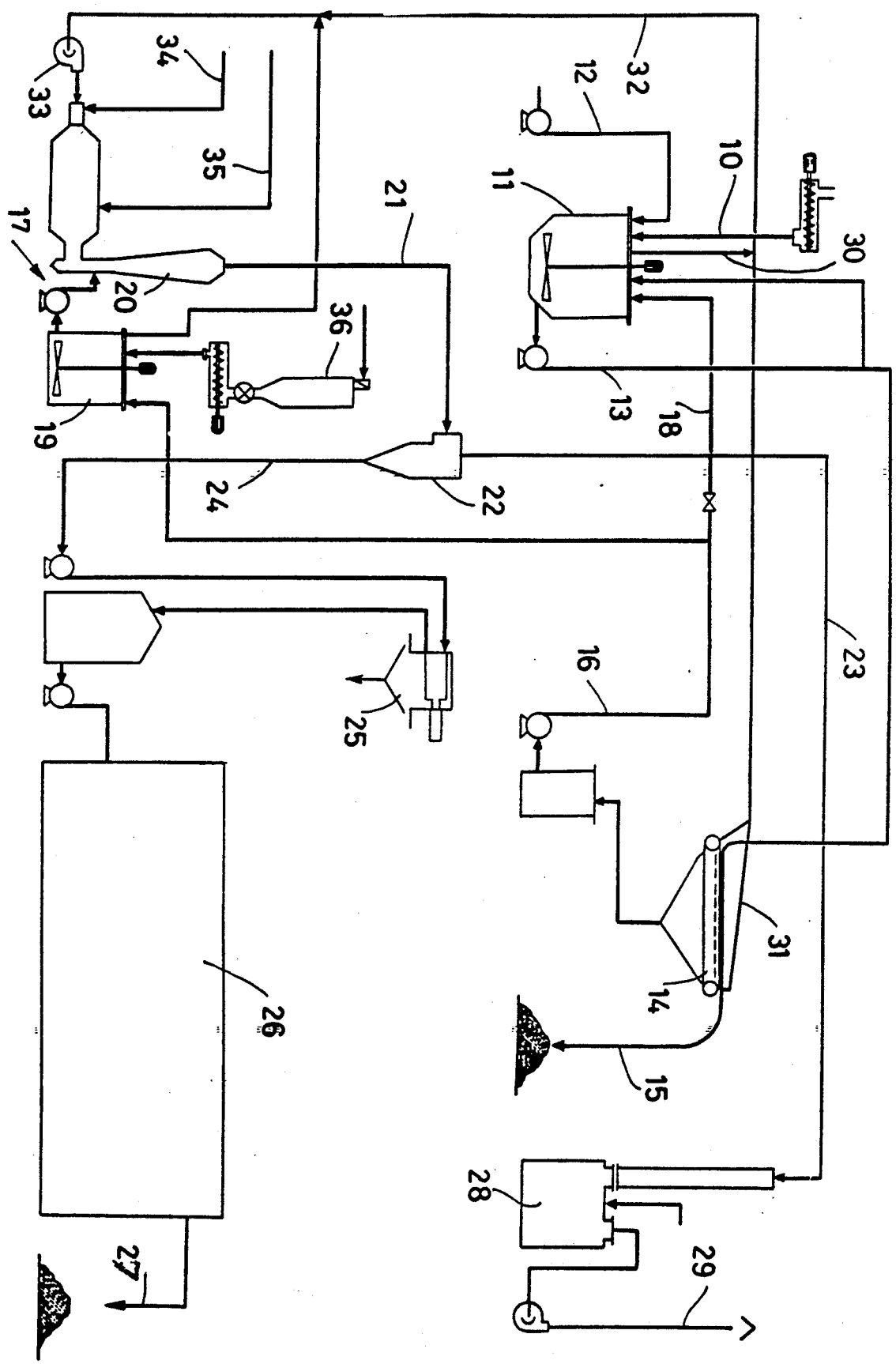

PROCESS FOR THE PROCESSING OF SLAG FROM ALUMINIUM SCRAP AND WASTE MELTING, RECOVERY OF COMPONENTS THEREOF AND TREATMENT OF GASSES GENERATED

Aluminium scrap and waste are usually melted in rotary or reverberatory furnaces with the addition of a melting flux consisting of NaCl or a mixture of NaCl and KCl with the addition of cryolite or fluorite to lower the melting point. The saline flux has the purpose of absorbing the organic and inorganic residues present in the scrap or which form during melting thereof as well as protecting the molten aluminium bath from oxidation.

After tapping the contents of the furnace there is formed a saline slag which creates serious disposal problems because of its composition. The quantity of slag obtained is on the order of 30–50% by weight of the aluminium produced depending on the type of aluminium scrap processed.

The secondary aluminium industry is subject to considerable pressure from the authorities responsible for environmental protection for elimination of the pollution caused by dumping huge quantities of this slag.

Saline slag treatment systems were developed long ago, recovering the ingredients having commercial value (as percentages of metallic Al and saline fluxes) and obtaining a residue consisting mainly of $Al_2O_3$ which, appropriately washed to remove its soluble salt content, is a raw material usable in the production of cement or which can be dumped without creating problems. In this common treatment process for saline aluminium slag there is thus provided a phase of dissolving in water the alkaline chlorides making up the saline flux, mainly NaCl and KCl.

In this operation of leaching with more or less hot water in a neutral, acid or alkaline environment, gases develop from the decomposition of substances always contained in the saline slag in small quantities, precisely: finely divided metallic aluminium, aluminium azide (AlN), aluminium carbide ($Al_4C_3$), traces of sulphides, phosphides, etc., which, reacting with the water, give rise to the formation of hydrogen, ammonia, methane, various hydrocarbons, sulphurated hydrogen, phosphine, arsine (traces), etc., are developed.

Hydrogen, methane and ammonia are by far the major components of the gases developed in the treatment of slag. But the additional presence of parts per million of extremely toxic substances such as principally phosphine and sulphurated hydrogen constitute a serious problem.

It has been proposed to construct plants which would be limited to exhausting the gases developed during leaching of the saline slag with water and discharging them into the atmosphere diluted with large quantities of air but it is clear that this system does not protect the environment and operators from components which are toxic even in very small quantities.

More recent slag processing plants call for the treatment of the gases developed by chemical/physical processes and specifically using oxidizing scrubbing towers where the phosphine is converted into $P_2O_3$ and the sulphurated hydrogen into sulphites and sulphates. Then the ammonia is eliminated by scrubbing with sulphuric acid. As an alternative it has also been proposed to pass the gases through adsorption towers over activated carbon which fixes these substances.

Both systems mentioned are effective in purifying gases from the more toxic components but they involve large investments and operating costs and above all produce by-products difficult to dispose of. The liquid effluents of the first system and the carbon loaded with toxic substances create obvious disposal problems.

The object of the present invention is to propose a treatment plant for saline slag from the pouring of aluminium made from scrap or waste wherein dispersion into the atmosphere of gases with highly toxic components and the production of by-products not allowed to dump are eliminated.

In accordance with the invention a process for processing saline slag from the melting of aluminium scrap or waste with fluxes containing alkaline chlorides comprises the phases of leaching said slag with water, filtration of the solution and concentration thereof for recovery of the chlorides characterized in that the gases which develop from leaching are burnt with the addition of supporting fuel for reaching their self-ignition temperature.

The associated plant in accordance with the invention comprising a vessel for leaching the slag with water, a filter for the solution obtained, and a concentrator thereof for recovery of the chlorides, is characterized in that it comprises means for collection of the gases which develop from leaching and combustion equipment for burning the gases with the addition of supporting fuel.

To better clarify the characteristics of the invention and its advantages there is described below an example of one form of embodiment with reference to the annexed drawing.

BRIEF DESCRIPTION OF DRAWING

The only FIGURE represents a general schematic view of a plant in accordance with the invention.

In the drawing reference number 10 indicates the feed duct to a dissolver or leaching tank 11 of saline slag obtained from the pouring of aluminium from a scrap melting furnace. The devices which collect, cool and grind the slag in the most suitable grain size for the dissolving treatment, common of themselves in this type of plant, are not described here because they are known to those skilled in the art.

The dissolving liquid comes from 12. The solution is taken by 13 and sent to a filter (or separator of another, functionally equivalent type) shown schematically by reference number 14, where the solid phase is separated at 15 and the liquid phase is sent from 16 to a concentration unit indicated generally by 17 and optionally partially recycled through 18 in the dissolver 11 to help increase the concentration of the solution contained therein.

The concentration unit 17 comprises a mixing vessel 19 which feeds the hot gas concentrator 20 from which the concentrated solution is sent through 21 to the separator 22.

From the separator 22 the gases issue at 23 while the concentrated solution issues at 24 and is sent to the filter-press 25, from which the solids in suspension in the solution are separated. Said solution is then treated in a unit 26 known in itself for evaporation of the aqueous phase and obtaining of solid salt at 27.

The gases collected from the duct 23 are sent to the scrubber 28 and then discharged to the atmosphere at 29 without emission of toxic or harmful compounds in accordance with the objects of the invention.

Adjacent to the dissolver 11 there is provided a duct 30 for collection of the gases which, as mentioned, develop in this leaching phase of the process. The relative slowness and progressiveness of development of the gases require provision of a hood 31 for collection of the gases adjacent to the filter 14. The gases thus collected in a manifold duct 32 are taken into the blower 33 and receive added fuel coming from 34 to feed the burner included in the concentrator shown schematically at 20 and which produces the hot gases used in the concentration which takes place therein. 35 indicates the combustion air inlet.

In the brine concentration phase this can be beneficially treated to adjust pH to a value suitable for precipitation of impurities, in particular in the form of hydroxides or carbonates of heavy metals or earthy alkaline (Fe, Cd, Cu, Pb, Ca, Mg, Zn, etc.).

For this purpose there can be provided a unit 36 for addition to the mixer 19 of the substance designed to secure the desired modification of the pH.

For example if the leaching of the slag at 11 takes place in an acid environment, typically by the addition of HCl, there can be added sodium carbonate (or NaOH) from 36 to obtain a pH of the brine higher than 9 to aid precipitation of impurities.

In this phase of the brine treatment there can also develop gases which are sent from 37 to the manifold duct 32.

It should be noted at this point that the gases which develop during the leaching of the slag are combustible, hence lend themselves well to the use proposed by the invention which eliminates them as harmless compounds.

The data given below show the combustion reactions, thermal values and self-ignition temperatures of the more significant compounds of the gases in question.

|  | Thermal value mf. (kcal/Nmc) | Combustion temperature (°C.) |
| --- | --- | --- |
| $H_2 + \frac{1}{2}O_2 \rightarrow H_2O$ | 2,574 | 571 |
| $2CH_4 + 3O_2 \rightarrow 2CO_2 + 6H_2O$ | 8,574 | 632 |
| $2NH_3 + 3O_2 \rightarrow N_2 + 6H_2O$ | 3,425 | 692 |
| $2H_2S + 3O_2 \rightarrow 2SO_2 + 2H_2O$ | 5,593 | 290 |
| $2PH_3 + 4O_2 \rightarrow P_2O_5 + 3H_2O$ |  | <300 |

In the elimination of the toxic components of the gases as proposed by the present invention an appreciable quantity of heat is recovered, considering the volumes involved, and the toxic or harmful gases can be decomposed by combustion with high conversion efficiency. Gas is burnt in a combustion chamber where the mixture is heated above the highest self-ignition temperature of the compounds present, e.g. 700° C. in the above case, with the aid of a supporting fuel.

The exact specifications for performance of the combustion can be varied depending on the characteristics of the combustion unit. The gases collected in treatment of the slag can be for example added to the fuel or the air in such a manner as to be used as a combustion supporter. It is useful to dilute the gases in air to a concentration below the explosion limits of the compounds.

In accordance with one of the beneficial uses of the combustion of the gases as proposed in the invention, the combustion products of the gases are sent to a system for recovery of the considerable heat of the gases, preferably accomplished by means of a Venturi-type apparatus where the hot gases are mixed with a liquid and transfer thereto by adiabatic conversion their heat content until they reach equilibrium.

As set forth above, the liquid used in this recovery can be the same saline solution obtained from leaching the slag, after being separated therefrom, as occurs at 20 in the plant shown schematically in the annexed drawing.

Such a form of embodiment of the invention presents many benefits. During the adiabatic conversion mentioned the saline solution becomes concentrated, recovering the considerable heat of the flue gases, hence also the heat produced by the toxic and harmful gases. This preferred type of heat recovery also provides effective collection by washing of several substances produced by combustion such as $P_2O_5$, which is produced by the combustion of phosphine and which is precipitated as insoluble phosphate reacting with several cations present in the saline solution (Ca, Mg, Fe, Al, Pb).

Therefore the solution is thoroughly filtered after concentration at 25 and is capable of undergoing at 26 a crystallization operation which produces at 27 solid alkaline chlorides (sodium and potassium) of very high purity.

In the above description of an example of an embodiment of the invention there are indicated principally those components of the slag recovery plant which are involved in the improvements which are the object of the invention. Accordingly all those known elements and devices known of themselves to those skilled in the art have been ignored since they can take on any of the configurations proposed by the art, even different from those indicated herein, to achieve equivalent functional effect.

We claim:

1. Process for the recovery and treatment of gases and saline solution that are produced during the processing of saline slag, which results from the melting of aluminum scrap or waste with flux containing alkaline chlorides, comprising the steps of leaching the saline slag with water thereby to produce numerous gases and a saline solution containing chlorides, filtering and concentrating the saline solution produced by said leaching step for recovery of the chlorides therein, adding a supporting fuel to the numerous gases which are produced during said leaching step, and burning said gases after the addition thereto of said supporting fuel thereby to produce heat and hot combustion gases.

2. Process in accordance with claim 1, including using the heat produced by combustion of said gases in a hot gas concentration to concentrate said saline solution obtained by leaching the slag.

3. Process in accordance with claim 2, including mixing the hot combustion gases produced by the combustion of the mixture of said supporting fuel and said numerous gases with the saline solution in a concentration apparatus for transfer of the heat to the saline solution, and scrubbing the hot combustion gases with said solution.

4. Process in accordance with claim 3, including directing the output from the concentration apparatus to a liquid and gaseous phase separator which produces therein a gaseous phase and a liquid phase containing a saline, discharging the gaseous phase from said separator to the atmosphere, and filtering and concentrating the liquid phase from said separator to crystallization to recover the saline content thereof in solid phase.

5. Process in accordance with claim 3, including treating the saline solution obtained from the leaching and subsequent filtration with an alkaline compound to obtain a pH higher than 8 before the saline solution is mixed with the hot combustion gases to aid in the separation of its components, and conveying the gases developed in this mixing step for combustion with the gases developed from leaching.

* * * * *